United States Patent [19]

Sjöö et al.

[11] 4,057,658

[45] Nov. 8, 1977

[54] METHOD OF IMPREGNATING WOOD WITH PLASTICS

[76] Inventors: Gunnar Arthur Sigvard Sjöö, Memoargatan 12, 422 42 Hisings Backa; Jan Anders Sundlin, Fack 400, 41 Goteborg, both of Sweden

[21] Appl. No.: 529,776

[22] Filed: Dec. 5, 1974

[30] Foreign Application Priority Data

Dec. 14, 1973 Sweden .............................. 7316900

[51] Int. Cl.$^2$ .............................................. B05D 3/06
[52] U.S. Cl. ................................ 427/44; 204/159.23; 427/385 R; 427/397
[58] Field of Search ........... 427/44, 36, 372 R, 385 R, 427/397 R; 204/159.23

[56] References Cited

U.S. PATENT DOCUMENTS

| | | | |
|---|---|---|---|
| 3,077,420 | 2/1963 | Kenaga | 427/44 |
| 3,246,054 | 4/1966 | Guenther et al. | 427/36 |
| 3,461,095 | 8/1969 | Plueddemann et al. | 260/830 R |
| 3,549,509 | 12/1970 | Casalina | 427/44 |
| 3,663,261 | 5/1972 | Miettinen et al. | 427/44 |
| 3,711,391 | 1/1973 | Feinberg | 427/44 |
| 3,721,579 | 3/1973 | Barrett | 427/44 |
| 3,912,837 | 10/1975 | Pesek et al. | 427/44 |

OTHER PUBLICATIONS

Meyer "Forest Products Journal" pp. 362–364, Sept. 1965.

*Primary Examiner*—John H. Newsome
*Attorney, Agent, or Firm*—Frank J. Jordan

[57] ABSTRACT

A method of increasing the strength of wood through impregnation thereof with a liquid containing a polymerizable monomer and/or oligomer and a setting agent, said agent being inactive at room temperature levels but activated when heated or exposed to radiation. The wood is impregnated with said liquid and thereafter heated in an oven or exposed to radiation in a radiation chamber.

9 Claims, No Drawings

METHOD OF IMPREGNATING WOOD WITH PLASTICS

BACKGROUND OF THE INVENTION

The present invention concerns a method of increasing the strength of wood by impregnating it with a polymerizable liquid.

According to some prior art methods the wood is initially introduced into a container which is evacuated for removal from the wood of moisture and gases (air). The container is thereafter filled with a liquid containing a polymerizable monomer and/or oligomer, and the wood is impregnated with this liquid under pressure. The polymerization of the polymerizable liquid to convert it to a plastic is thereafter carried out by means of radioactive radiation for approximately 24 hours, usually with the aid of a cobalt gun.

A method of this kind suffers from several disadvantages. The method is expensive on account of the polymerization through radiation. The acquisition of a cobalt gun also means that considerable capital must be invested. In order to effect the polymerization process very rapidly as possible the generated radiation may be too strong, which means degradation of the wood and damage thereof. Consequently, it is necessary that great care is exercised and the intensity of the radiation is delimited, which on the other hand has the negative result of prolonging the polymerization process, normally up to some 24 hours.

SUMMARY OF THE PRESENT INVENTION

The purpose of the present invention is to simplify the type of method described in the introduction and make it more economical in several respects. It is characteristic of the invention that in the polymerizable liquid intended for the impregnation of the wood, is used a setting agent which is dormant at room temperatures and some degrees above that level (30° C) but is rapidly activated at higher temperatures or by electro-magnetic radiation, that the wood is impregnated with the polymerizable liquid, and that the polymerization is performed in an oven at temperatures ranging between 60° and 150° C, preferably at 80° C, or by radiation in a radiation chamber at room temperatures. Expensive equipment, such as a cobalt gun, is no loner a necessity; instead, a conventional heating oven for drying the wood will suffice as also a source of radiation, such as an X-ray tube, and consequently it becomes possible to carry out the polymerization process at a considerably higher speed. In addition, the method is economical in the respect that the polymerization does not start in the pressure container but only after transfer of the wood to the oven, which means that surplus polymerizable liquid in the container may be used in subsequent treatment batches, and all waste is therefore eliminated.

As the polymerizable component in the liquid composition it has been found suitable to use an epoxy resin with or without a reactive thinning agent, an unsaturated polyester dissolved in styrene or vinyl toluene, or methyl methacrylate.

As setting agents for the epoxy resin, boron trifluoride monoethylamine, triethanol aminoborate, dicyandiamide, acid anhydride, an organic an acid or a penta- or hexa-coordinate silicone salt have proved satisfactory.

As setting agents for unsaturated polyester or methyl methacrylate it is possible to choose a tertiary butylperbenzoate or a bitertiary butylperoxide. Possible are also the following substances:

2,2-bis(t-butyl peroxy) butane
Di-t-butyl peroxide
2,5-dimethyl-2,5-di(t-butyl peroxy) hexane
t-butyl hydroperoxide
t-butyl perbenzoate
Cumene hydroperoxide
Dicumyl peroxide
2,5-dimethyl-2,5-di(t-butyl peroxy)hexyne-3
n-butyl-4,4-bis(t-butyl peroxy)valerate
1,1-bis(t-butyl peroxy) -3,3,5-trimethyl cyclohexane

DETAILED DESCRIPTION OF A PREFERRED EMBODIMENT

One embodiment of the method in accordance with the invention will be described in the following, the wood chosen being untreated pine having certain specific values as follows:

flexural stress kp/mm$^2$ = 11.20
flexural extensibility % = 1.04
flexural deformation work kpmm/mm$^2$ = 3.75

The untreated wood was introduced into a pressure container which via a valve cock communicated with a storage tank holding a liquid mixture of a polymerizable monomer and/or oligomer and a setting agent as outlined above. The tank was closed and evacuated, the pressure being maintained for some time at 10 Torricelli. During this treatment, moisture and gases were expelled from the wood. The cock valve was then opened without previous pressure equalization, whereby the liquid plastics flowed into the container until the liquid level was enough to cover the wood, at which point the valve cock was again closed. The pressure inside the container was then again raised up to about 6 absolute atmospheres which forced the liquid mixture to penetrate into the wood. The temperature was maintained in the range of between 20° and 25° C. Following this pressure treatment the wood was removed from the container. The surplus of the liquid mixture was pumped back to the storage tank.

The wood was then transferred into an oven in which the temperature was held at 80° C. As soon as the wood had been heated to this temperature throughout, polymerization for another 20 minutes only was necessary to complete the process. The heating time to reach 80° varies from one to several hours, dependent on the dimensions of the object treated. After removal of the wood from the oven the following values were determined:

flexural stress kp/mm$^2$ = 19.3
flexural extensibility % 1.56
flexural deformation work kpmm/mm$^2$ = 9.95

Below are the corresponding values for other kinds of wood treated in the same manner:

|  | Flexural stress kp/mm$^2$ | Flexural extens. % | Flexural deform. work kpmm/mm$^2$ |
| --- | --- | --- | --- |
| untreated ash | 40.5 | 2.45 | 28.4 |
| treated ash | 61.5 | 3.54 | 61.0 |
| untreated ramine | 26.3 | 1.64 | 11.9 |
| treated ramine | 43.4 | 2.58 | 31.4 |
| untreated copper beech | 24.0 | 1.94 | 14.9 |
| treated copper beech | 52.6 | 3.30 | 49.3 |

The invention is not limited to the embodiment described above but may be varied in several ways within the scope of the appended claims. For instance, by raising the temperature in the oven well above 100° C the polymerization process is further accelerated.

What we claim is:

1. In a method of increasing the strength of wood through impregnation thereof with a polymerizable liquid, comprising positioning the wood in a container, evacuating said container to remove moisture and air from the wood, and subsequently impregnating the wood under pressure with a polymerizable liquid and a setting agent, the improvement in which the setting agent is dormant at temperatures up to 30° C. but is rapidly activated at higher temperatures and comprises at least one of the following substances, 2,2-bis(t-butyl peroxy) butane,
2,5-dimethyl-2,5-di(t-butyl peroxy) hexane,
2,5-dimethyl-2,5-di(t-butyl peroxy) hexyne-3,
n-butyl-4,4-bis(t-butyl peroxy) valerate,
1,1-bis(t-butyl peroxy)-3,3,5-trimethyl cyclohexane, and after the impregnating, polymerization of the polymerizable liquid in the wood impregnated therewith is conducted in an oven at temperatures in the range of 60° to 150° C.

2. An improved method as claimed in claim 1, wherein said polymerizable liquid comprises an unsaturated polyester and said polyester is dissolved in styrene.

3. An improved method as claimed in claim 1, wherein said polymerizable liquid comprises an unsaturated polyester and said polyester is dissolved in vinyl toluene.

4. An improved method as claimed in claim 1, wherein said polymerizable liquid comprises methyl methacrylate.

5. An improved method as claimed in claim 1, wherein the polymerization is conducted at 80° C.

6. In a method of increasing the strength of wood through impregnation thereof with a polymerizable liquid, comprising positioning the wood in a container, evacuating said container to remove moisture and air from the wood, and subsequently impregnating the wood under pressure with a polymerizable liquid and a setting agent, the improvement in which the setting agent is dormant at temperatures up to 30° C. but is rapidly activated by electromagnetic radiation and comprises at least one of the following substances, 2,2-bis(t-butyl peroxy) butane
2,5-dimethyl-2,5-di(t-butyl peroxy) hexane
2,5-dimethyl-2,5-di(t-butyl peroxy) hexyne-3
n-butyl-4,4-bis(t-butyl peroxy) valerate
1,1-bis(t-butyl peroxy)-3,3,5-trimethyl cyclohexane, and after the impregnating, polymerization of the polymerizable liquid in the wood impregnated therewith is conducted by exposing the impregnated wood to radiation in a radiation chamber at room temperatures.

7. An improved method as claimed in claim 4, wherein said polymerizable liquid comprises an unsaturated polyester and said polyester is dissolved in styrene.

8. An improved method as claimed in claim 6, wherein said polymerizable liquid comprises an unsaturated polyester and said polyester is dissolved in vinyl toluene.

9. An improved method as claimed in claim 6 wherein said polymerizable liquid comprises a methyl methacrylate.

* * * * *